Patented July 19, 1938

2,124,235

UNITED STATES PATENT OFFICE 2,124,235

COMPOSITIONS OF MATTER

Martin Mueller-Cunradi, Michael Otto, Walter Daniel, and Robert Werner, Ludwigshafen-on-the-Rhine, Germany, assignors to I. G. Farbenindustrie Aktiengesellschaft, Frankfort-on-the-Main, Germany No Drawing. Application July 3, 1934, Serial No. 733,626. In Germany July 8, 1933

1 Claim. (Cl. 49—81)

This invention relates to new and useful compositions of matter, more particularly to those which consist of an adhesive material and one or more solid materials of any kind, as for example wood, metal, glass, paper, concrete, resins, waxes, fibrous masses, leather, rubber, mineral filler or the like.

As is well-known, the usual adhesives are not adapted for making up compositions from all kinds of solid materials.

Now, the present invention makes use of the discovery that there are certain highly polymeric hydrocarbon materials which possess certain adhesive properties and are excellently adapted for making up compositions of matter with any solid materials.

It has been found that the high polymers of iso-olefines, more particularly of isobutylene are such hydrocarbon materials possessing such adhesive properties.

The polymers used according to this invention are materials having a very high molecular weight, usually of at least about 1000 and ranging up to a value in the neighborhood of 10,000 and even much higher, depending on the manner in which they are made. Such polymers may be obtained by polymerizing unsaturated hydrocarbons such as isobutylene. The polymerization may be carried out at temperatures below 0° or preferably not exceeding 10° below zero C. and especially at between 40° and 80° below zero C. with a catalyst of the Friedel-Crafts type such as boron fluoride, although aluminium chloride, titanium tetrachloride, etc., may also be used in many cases. The molecular weight of the polymer generally depends the purity of the unsaturated hydrocarbon, the catalyst and the temperature of polymerization. The higher polymers are obtained at very low temperatures and with very pure olefines.

It is the polymers thus obtainable which we have found to possess the aforesaid adhesive properties and to be suitable for making up the compositions of matter.

The wide field of application of these hydrocarbon polymers will now be indicated in a general way by explaining broadly the typical fields where these polymers may be employed, thereafter a further explanation of the invention will be given in the form of specific examples.

By using the said polymers it is possible to impregnate fibrous materials, such as cloths, textiles, leather and the like. The compositions thus obtained may be used for example for adhesive plasters for medical purpose, for insulating layers for electrical wires or cables or as waterproof protective materials and the like. The compositions made from leather with the said compounds also have the advantage of being waterproof.

Another object for which the hydrocarbon polymers may be used according to the present invention, is the joining of materials examples of which are glass, paper, wood or metal. In this way glass plates, for example, may be joined to produce non-splintering or safety glass. Or several layers of wood may be combined to form a sheet of plywood. Similarly broken objects may be cemented together by using the polymerized hydrocarbons.

The hydrocarbon polymers may also be used as caulking and sealing compositions, for instance for decks of boats. In this case they may advantageously be mixed with inert fillers such as lithopone, mineral wool or the like.

They may also be used for household purposes when it may be advantageous to use the polymers or adhesive compositions made therefrom in mixture with a volatile solvent.

Instead of combining the polymers with textile materials it is also possible to use them in connection with asbestos and, if desired, wire-cloth for making brake-linings.

It has further been found that the said polymers are very suitable as such or in mixture with other materials for anti-skidding compositions for motor car tires or driving belts. The use of such compositions prevents skidding.

Another application of the new materials is the use as or in connection with fly-paper or other insect or vermin destroyer. By mixing linseed oil, wax, sugar with isobutylene polymer, there may be obtained a composition which may be applied to suitable bases for instance paper and used as flypaper.

The adhesive properties of the polymerized material may be further utilized for the manufacture of compositions adapted for the treatment of the lower surface of Ski and as adhesive compositions for sealing wounds of trees or other plants. Such a composition may for example consist of polymeric isobutylene, wax and tallow.

It is also possible to make up compositions adapted for use as chewing gum by mixing isobutylene polymer with beeswax and starch. The compositions may contain sugar and may be perfumed with eucalyptus oil or the like.

Further it is possible to make a cleaning composition adapted for cleaning solid surfaces, such as smooth surfaces like wall paper and irregular surfaces like the type of typewriters, sculptures and the like.

The polymerized hydrocarbons may also be used to protect steel, wood, alloys and other surfaces from corrosion, oxidation, rusting and the like. It is further possible to protect fruits and the like by the said compounds from decay by mould.

The following examples describe the invention in detail. It should, however, be noted that our invention is not in any way limited to these examples. The parts are by weight.

Example 1

A mixture adapted for adhesive plaster is obtained by melting 40 parts of polymerized isobutylene of the specific viscosity of 4.8 (determined in a solution of 2.8 per cent strength in tetrahydronaphthalene) with 10 parts of brown-coal tar pitch.

Example 2

A compound glass is obtained by placing a thin layer of polymerized isobutylene of the specific viscosity of 8.2 (determined in a solution of 2.8 per cent strength in tetrahydronaphthalene) on a warm glass plate, covering it with a second plate and pressing the whole while heating.

In a similar manner sheets of wood are combined into ply-wood.

Example 3

A thermoplastic composition adapted to cement broken objects is obtained by melting 15 parts of polymerized isobutylene of 4.8 specific viscosity (determined in a solution of 2.9 per cent strength in tetrahydronaphthalene), 15 parts of guttapercha, 15 parts of shellac and 5 parts of sulphur.

Example 4

An excellent brake-lining is obtained by impregnating a fabric made from asbestos and wire with polymerized isobutylene of 8.2 specific viscosity (determined in a solution of 2.8 per cent strength in tetrahydronaphthalene), at a temperature of 200° C. Advantageously the air enclosed in the cloth is removed by evacuation. Or impregnation with the isobutylene polymer may be effected in vacuo.

Example 5

An excellent anti-skidding composition for motor-car-tires and belts is obtained by melting 20 parts of polymerized isobutylene having a viscosity between about 2 and 3 (determined in a solution of 2.8 per cent strength in tetrahydronaphthalene) with 15 parts of petrolatum, 10 parts of tallow and 5 parts of montan-wax bleached by oxidation. This mixture is applied to the belt or tire while heating.

Example 6

An impregnating-mass adapted for fly-papers is obtained by melting 45 parts of polymerized isobutylene of 2.5 specific viscosity (determined in a solution of 2.8 per cent strength in tetrahydronaphthalene) with 10 parts of linseed oil and 5 parts of montan-wax bleached by oxidation. The material thus obtained is mixed with sugar and applied to paper or the like.

Example 7

A mixture excellently adapted for the treatment of the sliding surface of skis is obtained by melting 25 parts of polymerized isobutylene of 2.5 specific viscosity (determined in a solution of 2.8 per cent strength in tetrahydronaphthalene) with 15 parts of montan-wax bleached by oxidation and 10 parts of tallow.

Example 8

An excellent wax-like mixture for sealing wounds of trees is obtained by melting 15 parts of polymerized isobutylene of 8.2 specific viscosity (determined in a solution of 2.8 per cent strength in tetrahydronaphthalene) with 10 parts of white oil (paraffin oil) and 25 parts of wool-grease.

Example 9

An adhesive plaster is obtained by placing by rolling a thin layer of polymerized isobutylene having a specific viscosity of between about 70 and 80 (determined in a solution of 2.8 per cent strength in tetrahydronaphthalene) on textile material. If necessary may be added antiseptic substances.

Example 10

Chewing gum is obtained by mixing 35 parts of polymerized isobutylene of 8.5 specific viscosity (determined in a solution of 2.8 per cent strength in tetrahydronaphthalene) with 15 parts of beeswax. This mixture is perfumed with eucalyptus oil and mixed with a little sugar.

Example 11

A cleaning composition is obtained by mixing 38.4 parts of polymerized isobutylene of 30 specific viscosity (determined in a solution of 2.8 per cent strength in tetrahydronaphthalene) with 27.9 parts of talc, 28.9 parts of tung oil gel, 5.7 parts of mineral oil and a small amount of glycerine.

Example 12

A mixture excellently adapted for the treatment of fruits is obtained by mixing 100 parts of paraffin oil, 6 parts of polymerized isobutylene and 94 parts of purest paraffin-wax.

Example 13

An excellent caulking material is obtained by mixing 50 parts of polymerized isobutylene with 50 parts of calcium carbonate.

Example 14

A waterproof paper is obtained by treating ordinary paper with a solution of 1 part of polymerized isobutylene and 5 parts of paraffin wax in 10 parts of benzine at a temperature of about 40° C. for about half a minute and then allowing the volatile solvent to evaporate.

Example 15

Waterproof linen cloth is obtained by treating linen cloth with a mixture of 10 parts of trichlorethylene, 1 part of polymerized isobutylene and 6 parts of paraffin wax obtained from brown coal at a temperature of 45° C. After a few minutes' treatment the volatile solvent is allowed to evaporate.

Example 16

A coating layer on wood is obtained by applying a mixture consisting of 10 parts of mineral oil, 2 parts of polymerized isobutylene and 8 parts of crude paraffin wax on wood.

Example 17

To protect crystals of copper sulphate from humidity they are treated with a mixture consisting of 10 parts of carbon tetrachloride, 2 parts of polymerized isobutylene and 1 part of pure paraffin wax.

Example 18

To protect pipes, steel plates and the like from moisture they are treated with a solution consisting of 5 parts of polymerized isobutylene and 95 parts of a refined mineral oil. This gives a light coating which prevents rusting.

Example 19

Sole leather is impregnated by soaking in a bath consisting of a fused mixture of 10 parts of polymerized isobutylene, 40 parts of stearic acid and 50 parts of paraffin wax.

What we claim is:—

Safety glass comprising a plurality of glass sheets combined with each other by means of a layer essentially comprising an isobutylene polymer having a molecular weight of at least about 1000.

MARTIN MUELLER-CUNRADI.
MICHAEL OTTO.
WALTER DANIEL.
ROBERT WERNER.